United States Patent
Wenning et al.

(10) Patent No.: US 6,224,179 B1
(45) Date of Patent: *May 1, 2001

(54) HEAT-INSULATING HOUSING AS WELL AS A HOUSEHOLD OVEN AND A HOUSEHOLD REFRIGERATOR HAVING THE HOUSING

(75) Inventors: Udo Wenning, Giengen; Wolfram Wacker, Hermaringen; Hans-Frieder Eberhardt, Herbrechtingen, all of (DE)

(73) Assignee: BSH Bosch und Siemens Hausgeraete GmbH, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,278

(22) Filed: Dec. 1, 1997

Related U.S. Application Data

(63) Continuation of application No. PCT/EP96/01910, filed on May 7, 1997.

(30) Foreign Application Priority Data

May 31, 1995 (DE) .............................................. 195 20 020

(51) Int. Cl.[7] .................................................. A47B 96/04
(52) U.S. Cl. .......................... 312/406; 312/400; 312/409; 220/592.09
(58) Field of Search .................................... 312/400, 401, 312/406, 406.1, 406.2, 409, 263, 296; 220/592.01, 592.02, 592.09, 592.1; 52/309.6, 309.9, 784.14, 784.15, 793.1, 794.1

(56) References Cited

U.S. PATENT DOCUMENTS

| | | | |
|---|---|---|---|
| 2,194,301 | * 3/1940 | Fourness et al. | 312/406 X |
| 2,345,792 | * 4/1944 | Cann | 312/400 X |
| 2,779,066 | * 1/1957 | Gaugler et al. | 220/592.09 X |
| 2,804,657 | * 9/1957 | Munters | 220/592.01 X |
| 2,896,271 | * 7/1959 | Kloote et al. | 220/592.09 X |
| 3,240,029 | * 3/1966 | Wurtz | 220/592.09 X |
| 3,999,820 | * 12/1976 | Haag | 220/592.09 X |
| 4,044,449 | * 8/1977 | Phan | 312/406 X |
| 4,180,297 | * 12/1979 | Abrams | 312/406 |
| 4,574,454 | * 3/1986 | Dyson | 312/409 X |
| 4,668,555 | * 5/1987 | Uekado et al. | 428/69 |
| 4,685,402 | * 8/1987 | Nelson et al. | 312/409 X |
| 4,692,363 | * 9/1987 | Reiss et al. . | |
| 4,808,457 | * 2/1989 | Kruck et al. | 312/406 X |
| 5,137,169 | * 8/1992 | Shulz et al. . | |
| 5,152,231 | * 10/1992 | Preston et al. | 312/409 X |
| 5,730,516 | * 3/1998 | Vismara | 312/406 |

FOREIGN PATENT DOCUMENTS

| | | | |
|---|---|---|---|
| 1246957 | * 8/1967 | (DE) | 312/409 |
| 9204365 | * 8/1992 | (DE) . | |
| 104511 | * 4/1984 | (EP) . | |
| 436827 | * 7/1991 | (EP) . | |
| 587546 | * 3/1994 | (EP) . | |
| 658733 | * 6/1995 | (EP) . | |

* cited by examiner

*Primary Examiner*—James O. Hansen
(74) *Attorney, Agent, or Firm*—Herbert L. Lerner; Laurence A. Greenberg; Werner H. Stemer

(57) ABSTRACT

A heat-insulating housing, such as for an oven chamber of a household oven or a refrigeration chamber of a household refrigerating appliance, includes at least one working space which is surrounded by housing walls and can be closed by a door. The housing walls are formed from two substantially dimensionally rigid housing shells which are at a spacing from each other and together substantially enclose an intermediate space that can be evacuated and is filled with heat-insulating material which can be introduced loosely.

21 Claims, 2 Drawing Sheets

HEAT-INSULATING HOUSING AS WELL AS A HOUSEHOLD OVEN AND A HOUSEHOLD REFRIGERATOR HAVING THE HOUSING

CROSS-REFERENCE TO RELATED APPLICATION

This application is a continuation of International Application Serial No. PCT/EP96/01910, filed May 7, 1996 now WO 96/38697.

BACKGROUND OF THE INVENTION

Field of the Invention

The invention relates to a heat-insulating housing having at least one useful housing space which is enclosed by housing walls and at least one door. The invention also relates to a household oven and a household refrigerator having a chamber with the housing.

Thermal insulation is achieved in various ways in the known prior art. In the field of household appliances, for instance, such as refrigerating appliances, ovens or the like, various insulating materials are used to insulate useful spaces. In ovens, an oven chamber that surrounds a baking space is provided with fibrous insulating materials on its outside which serves the purpose of thermal insulation, and in refrigerating appliances high-resistance foams are used for thermal insulation. The high-resistance foams are introduced in the form of liquid starting components between an outer metal housing and an inner plastic lining for joining the two together after a chemical reaction has taken place. Vacuum insulating panels are also used instead of the high-resistance foam insulation for purposes of insulation in the field of refrigerating appliances. The vacuum insulating panels are introduced into an interstice between the outer metal housing and the inner plastic lining. In that case, transitions between the individual wall portions of the heat-insulating housing of a refrigerating appliance are also filled with high-resistance plastic foam. As far as refrigerating appliances are concerned, the thermal insulation techniques which were used heretofore in the field of household appliances are disadvantageous especially in the event of recycling of the appliances, which is gaining increasing importance, since the various materials forming the heat-insulating housing are joined together into a unit by the high-resistance foam insulation, and separating the unit into its individual materials entails complicated and expensive separating processes, because of the adhesion action of the liquid foam. With regard to fibrous thermal insulating materials used in household ovens, such materials, because of their fibrous nature, are time-consuming to install in the oven chamber to be insulated and moreover involve the risk of individual fibers becoming dissolved out of the fibrous composition of the insulating material and becoming deposited at contact points of electrical function units, where they may cause problems regarding oven function because of their insulating nature.

SUMMARY OF THE INVENTION

It is accordingly an object of the invention to provide a heat-insulating housing as well as a household oven and a household refrigerator having the housing, which overcome the hereinafore-mentioned disadvantages of the heretofore-known devices of this general type in a simple way and which at the same time make it possible to markedly improve the thermal insulating action of the housing in a simple way.

It is accordingly an object of the invention to provide a heat-insulating housing, comprising housing walls formed of two mutually spaced apart boundary walls substantially enclosing an interstice; at least one door enclosing at least one useful housing space along with the housing walls; and slabs of pressure-resistant, open-celled, evacuatable heat insulation material in a final chemical state to be introduced loose into the interstice for filling the interstice.

Through the use of this structure according to the invention, a heat-insulating housing is created which when recycled can be broken down at little technical effort and thus in an economical manner into maximally pure material components, which can thus be used in turn as technically high-quality materials. Moreover, due to the construction of the housing according to the invention an insulation process that is favorable from a production standpoint is achieved, which makes cost-intensive devices for environmental protection and for protecting the health of the production workers unnecessary. Moreover, sealing provisions of the kind previously employed to prevent the escape from refrigerating appliances of high-resistance foam insulation introduced in the form of liquid starting components, can be dispensed with. Additionally, influence on electrical appliance functions from individual insulating fibers of fibrous insulating materials that could unintentionally plug up electrical contact paths is substantially precluded.

In accordance with another feature of the invention, the boundary walls are constructed to be maximally dimensionally rigid. Through the use of the dimensionally rigid boundary walls, the thermal insulation material introduced into the interstices can be densified to improve the heat-insulating properties of the housing walls, without additionally having to support the boundary walls through the use of a supporting form.

In accordance with a further feature of the invention, the heat insulation material is formed of slabs of open-celled polymer foams. The heat insulation material, which is constructed with open cells, not only permits a substantially simpler but also a markedly greater pressure reduction in the interstice as compared with the ambient pressure of the housing walls, and at the same time, because of the dimensionally rigid boundary walls and the pressure proof insulating material, substantially flat surfaces are created, even after an evacuation of the interstice, which without further provisions can serve at the same time as visible or transparent surfaces for the housing walls.

In accordance with an added feature of the invention, the air pressure is lowered in the interstice filled with the heat insulation material as compared with the ambient pressure of the housing, and the boundary walls demarcating the interstice are formed of a material that is diffusion proof at least approximately in accordance with the pressure difference. Effective insulation for housing walls that is constant in terms of its long-term effect can be achieved through the use of such a structure.

In accordance with an additional feature of the invention, sufficiently good thermal insulation can be created if the air pressure in the interstice filled with the open-celled, pressure-proof heat insulation material is between 0.01 mbar and 100 mbar, but is preferably below 1 mbar.

In accordance with yet another feature of the invention, especially flat surfaces in an evacuated interstice between the boundary walls are obtained if the pressure-proof open-celled heat insulation material, in terms of the thickness of the material, is approximately equivalent to the spacing between the boundary walls.

In accordance with yet a further feature of the invention, especially effective thermal insulation for the housing walls, and especially effective support in the event of evacuation of the interstice, is attained for the boundary walls if the pressure-proof open-celled heat insulation material is disposed substantially over the entire surface of the housing.

In accordance with yet an added feature of the invention, the open-celled, pressure-proof heat insulation material is formed of aerogels, which are condensed constantly during the process of filling the interstice, with a density of from 80 to 300 kg/m³, and preferably with a density in a range from 80 to 120 kg/m³.

Through the use of this kind of filling of the interstice, a coefficient of thermal conductivity for the housing walls is attained having a value, even without reducing the air pressure in the interstice between the boundary walls, which is markedly below that of the insulation techniques previously used in the field of household appliances.

In accordance with yet an additional feature of the invention, the pressure-proof, open-celled heat insulation material is formed of slabs with joining aids disposed at locations at which they are connected to one another.

Through the use of this kind of insulating material that can be introduced loose into the interstice, it is assured that flat surfaces and thus satisfactory visible or transparent surfaces for the housing walls are formed in the event that the interstice is evacuated, even in the case of flexible boundary walls.

In accordance with a further feature of the invention, the slabs are formed of cured polystyrene foam.

In accordance with again another feature of the invention, the slabs are manufactured from hardened polyurethane foam.

The use of an interstice which is filled with this kind of insulation material and evacuated achieves values for the coefficient of thermal conductivity of the housing walls that are substantially lower in comparison with the insulation techniques previously employed in the household appliance field, thus achieving a markedly more favorable energy consumption for a household appliance.

In accordance with again a further feature of the invention, there are provided empty tubes disposed inside the heat insulation material for receiving control and/or supply lines.

This permits electrical connection and installation work in household refrigerating appliances or household ovens to be carried out especially simply. At the same time, such an embodiment maximally assures the avoidance of unintended heat bridges by the purposeful introduction of the empty tubes.

In accordance with again an added feature of the invention, the boundary walls of the housing walls are formed of deep-drawn special steel. Such boundary walls have proved to be especially dimensionally stable and diffusion-proof, and thus especially favorable with regard to maintaining a negative pressure in the interstice over long periods of time.

In accordance with again an additional feature of the invention, the boundary walls of the housing walls are formed of corrosion-protected sheet steel. In this case, machining of the boundary walls that is markedly easier as compared with special steel, and thus easier manufacture of the housing walls, is achieved.

In accordance with still another feature of the invention, the boundary walls of the housing walls are formed of diffusion-proof plastic.

Such boundary walls that are used for housing walls are distinguished not only by their problem-free and thus economical machinability but also by low weight, which results in favorable handling in mass production.

In accordance with still a further feature of the invention, the boundary walls have dimensions which correspond to the dimensions of the individual wall portions of the housing and can be joined together to make the housing.

The modular construction technique for a housing, along with a relatively low number of individual housing walls of different dimensions, affords good possibilities for combining the housing walls with one another and thus permits a relatively great variety of housings of different dimensions at little effort and expense for storage. Moreover, the modular construction of the housing makes it possible not only to markedly reduce the labor involved for filling the interstice with heat insulation material, but also provides for a markedly reduced evacuation time therefor.

In accordance with still an added feature of the invention, the boundary walls are formed of a dimensionally rigid board that is angled in accordance with the individual housing walls of the housing and joins all of the housing walls to one another.

This kind of housing construction is distinguished by maximally constantly good thermal insulation over all of its wall portions. This thermal insulation is not vulnerably affected by structurally dictated heat bridges that may occur between the individual wall portions.

In accordance with still an additional feature of the invention, one of the boundary walls is provided with a connection for reducing the air pressure inside the interstice enclosed by the two boundary walls.

In accordance with another feature of the invention, the boundary walls have free ends, at least maximally diffusion-proof connecting elements join the boundary walls to one another at the free ends, and the connecting elements have a coefficient of thermal conductivity $\lambda$ of 0.1 W/mK to 21 W/mK, preferably a maximum of 1 W/mK.

With the objects of the invention in view there is also provided a household oven, comprising an oven chamber formed of a heat-insulating housing including housing walls formed of two mutually spaced apart boundary walls substantially enclosing an interstice; at least one door enclosing at least one useful housing space along with the housing walls; and slabs of pressure-resistant, open-celled, evacuatable heat insulation material in a final chemical state to be introduced loose into the interstice for filling the interstice.

Such an oven can be operated especially economically from an energy standpoint and can be disposed of especially simply for recycling.

With the objects of the invention in view there is additionally provided a household refrigerating appliance such as a refrigerator or freezer or the like, comprising at least one refrigeration chamber closable by a door disposed inside a housing, the housing including housing walls formed of two mutually spaced apart boundary walls substantially enclosing an interstice; at least one door enclosing at least one useful housing space along with the housing walls; and slabs of pressure-resistant, open-celled, evacuatable heat insulation material in a final chemical state to be introduced loose into the interstice for filling the interstice.

Such a refrigerating appliance can also be operated especially economically from an energy standpoint and can be disposed of especially simply for recycling.

Other features which are considered as characteristic for the invention are set forth in the appended claims.

Although the invention is illustrated and described herein as embodied in a heat-insulating housing as well as a household oven and a household refrigerator having the housing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
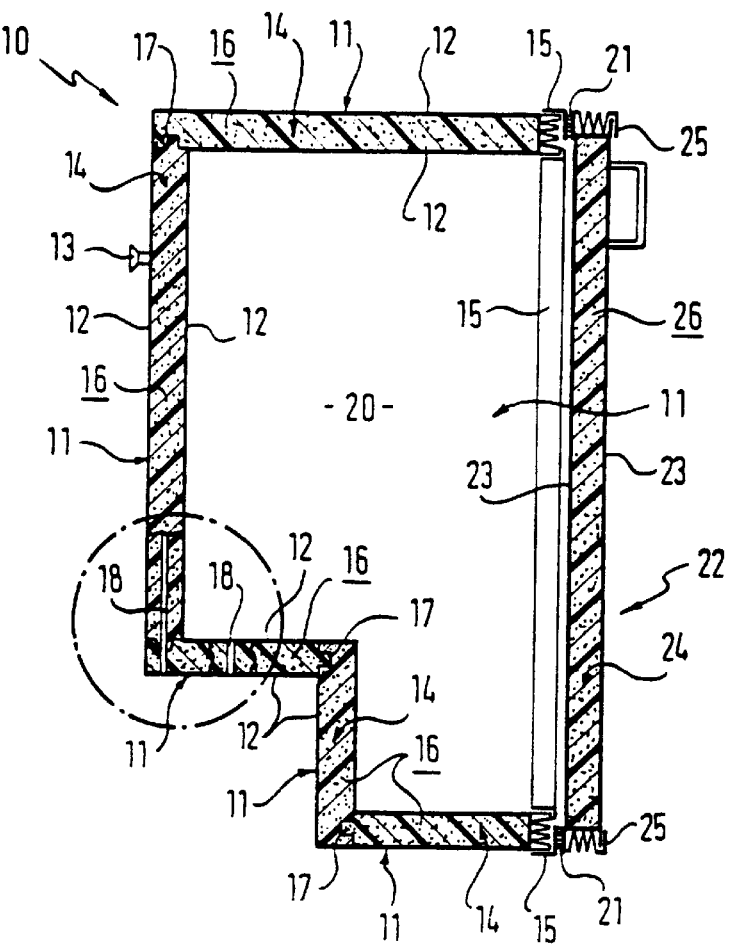
FIG. 1 is a simplified, diagrammatic, basic vertical-sectional view of a first exemplary embodiment of a housing of a household refrigerating appliance with boundary walls spaced apart from one another, one behind the other, and joined together at their free ends by a connecting frame.
Figure 2:
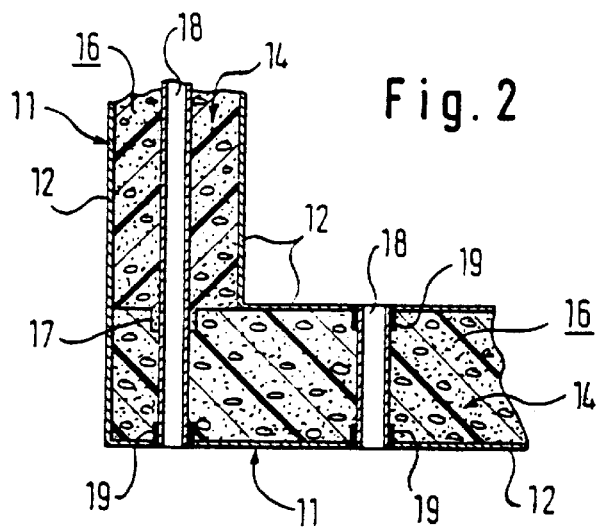
FIG. 2 is an enlarged, fragmentary, vertical-sectional view of a portion of the heat-insulating housing encircled by a dot-dash line in FIG. 1, with empty tubes disposed therein for receiving supply and control lines for operating the overall appliance.

Referring now to the figures of the drawings in detail and first, particularly, to FIG. 1 thereof, there is seen a heat-insulating housing 10 with housing walls 11, in a household refrigerating appliance, such as a refrigerator or a freezer. The housing walls 11 are each formed of two one-piece boards, spaced apart from one another and acting as boundary walls 12, which are bent at angles to correspond to the dimensions of the housing walls 11 and which are made of special sheet steel, corrosion-protected sheet steel, each with a wall thickness of 0.5 mm, for instance, or a vacuum-proof plastic, by deep-drawing. One of the outer spaced-apart boundary walls 12 is equipped with an evacuation connecting branch or coupling 13. The two boundary walls 12 form an interstice 14, which is closed off in a vacuum-tight manner on free ends of the boundary walls 12 with connecting frames 15 (also seen in FIG. 3) that are disposed on the boundary walls in a vacuum-tight manner. Good thermal insulation properties have already been demonstrated for these frames when a material with a coefficient of thermal conductivity of a maximum of 1 W/m K is used. The interstice 14 is filled with an open-celled heat insulation material 16, which is in its final chemical state and is constructed to be pressure-proof. In the present exemplary embodiment, the heat insulation material 16 is formed of hardened polyurethane foam or polyisocyanate foam, polystyrene foam, or other open-celled polymer foams, formed into slabs, having a slab thickness that is equivalent to the spacing between the boundary walls 12 and having slab dimensions which are adapted to the dimensions of the housing walls 11. The slabs of polyurethane foam, for instance, acting as the heat insulation material 16 are joined together where they abut through a tongue and groove connection 17 (also seen in FIG. 2) to avoid heat bridges. Other relevant, known connecting techniques would also be conceivable for joining together the individual slabs. The thermal insulation slabs 16 are equipped with recesses for receiving empty tubes 18 (see particularly FIG. 2), which may be made of poorly heat-conducting material, such as plastic, which are fixed inside the heat insulation material 16 through fastening elements 19 disposed in a vacuum-proof manner on the boundary walls 12, and which are supplied to the outsides of the boundary walls 12. The empty tubes 18 serve to receive non-illustrated control and supply lines which are to be provided for operating a non-illustrated refrigerating machine that serves to generate cold within a useful housing space 20 used as a refrigerator or freezer chamber.

The housing space 20 is enclosed by the heat-insulating housing 10 and a heat-insulating door 22, which is hinged to an opening side of the housing and contacts an opening edge of the housing 10 through a magnetic seal 21. Like the housing walls 11, the door 22 is manufactured from two spaced-apart, dimensionally rigid and, for instance, special steel sheets or corrosion-protected sheet steels, each with a material thickness of 0.5 mm, for instance, or from a diffusion-proof plastic. In this case as well, an interstice 24 is created through the use of spaced-apart boundary walls 23 at the door 22. The interstice 24 is closed off in a vacuum-tight manner at free end surfaces of the boundary walls 23 with connecting frames 25 (seen in FIG. 3) and is filled over the height and width of the door 22 with heat insulation material 26. As in the case of the housing 10, the heat insulation material is introduced into the interstice 24 before the connecting frame 25 is mounted, and in the present exemplary embodiment, as in the case of that used with the housing walls 11, the heat insulation material is constructed as an open-celled slab that is in its final chemical state, for instance maximally pressure-proof polyurethane foam. The slab is adapted in terms of its material thickness to the spacing of the two boundary walls 23, and in the case of the door 22, it is disposed integrally over the entire surface of the door.

In order to increase the thermal insulation properties of the housing 10 and the door 22, the vacuum-tight interstices 14 and 24, which are created by their respective boundary walls 12 and 23 and respective connecting frames 15 and 25, are evacuated to a pressure which as a rule is below 1 mbar. At least one evacuation connecting branch or fitting can be provided and connected to a non-illustrated evacuation pump for evacuating each of the respective interstices 14 and 24 of the housing 10 and the door 22, which are filled with the respective heat insulation material 16 and 26. The connecting branch 13 which is provided for that purpose on the housing 10 can be seen, while the connecting branch disposed on the door 22 is not shown. The pressure acting upon the boundary walls 12 and 23 because of the evacuated interstices 14 and 24 is substantially absorbed by the dimensionally rigid construction of these walls, as well as by the maximally pressure-proof slabs of polyurethane foam.

As an alternative to the heat insulation material 16 of slab-like polyurethane foam, for instance, aerogels with a density of from 80 to 120 kg/m$^3$ and with a surface area of approximately 7·105 m$^2$/kg, for instance, may be used for filling the interstices 14 and 24. This heat insulation material 16 is constantly densified and compressed during the filling process to improve the thermal insulation performance. After the conclusion of the process of filling the interstices 14 and 24, the interstices are finally closed in a vacuum-tight manner by the respective connecting frames 15 and 25, and then air pressure is reduced, as a rule to a value of below 1 mbar.

Figure 3:
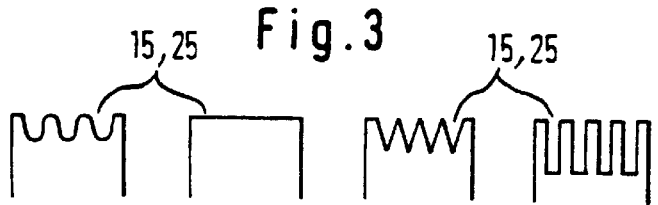
FIG. 3 is a simplified, vertical-sectional view of variously constructed cross sections of the connecting frame.

As is shown in FIG. 3, the connecting frames 15 and 25 may be constructed with different profiles. The purely rectangular cross section represents the shortest heat conduction path, while the other cross-sectional shapes entail a marked lengthening of the heat conduction path.

As an alternative to the housing construction shown in FIG. 1, it would also be conceivable to manufacture the housing 10 on the principle of a "folding box", or in the form of a one-piece, four-sided hollow body with an attached back wall. Housings which are constructed in this way are suitable, for instance, for use for oven chambers that surround a baking chamber, or for constructing climatic or environmental chambers.

Figure 4:
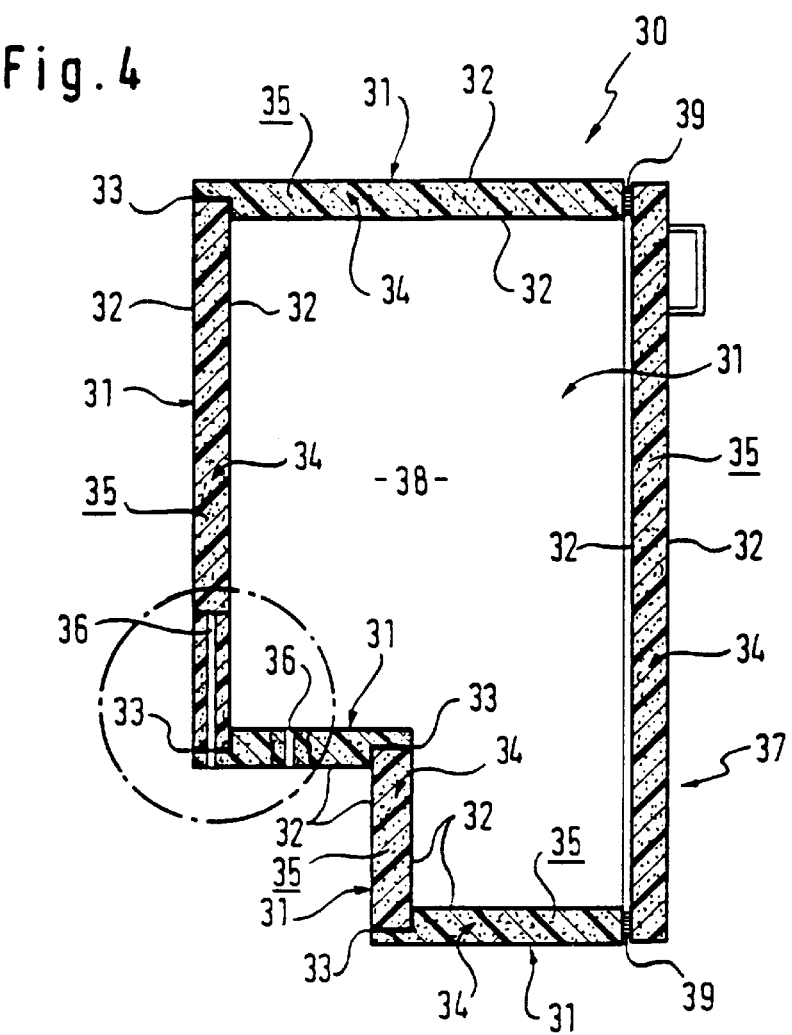
FIG. 4 is a vertical-sectional view of a second exemplary embodiment of a household refrigerating appliance with a heat-insulating housing that is composed of individual housing wall portions and has a door disposed thereon.
Figure 5:
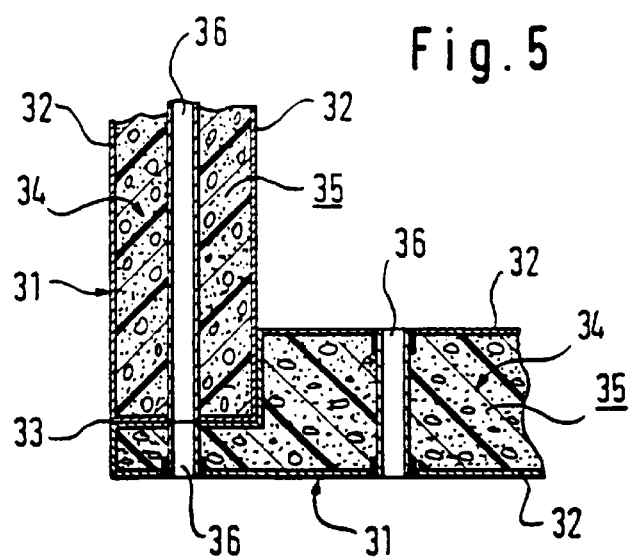
FIG. 5 is an enlarged, fragmentary, vertical-sectional view of a portion of the heat-insulating housing encircled by a dot-dash line in FIG. 4.

FIG. 4 shows a heat-insulating housing 30 that is suitable for use for a household refrigerator or freezer and which is made from individual housing walls 31, in contrast to the housing 10 shown in FIG. 1, having boundary walls 12 which are formed of a one-piece board shaped to fit the housing walls 11. These walls have dimensionally rigid boundary walls 32 and are joined together at their connecting points with joining aids 33 (see particularly Fig, 5) in order to lengthen the heat conduction path at the abutting points. The boundary walls 32, which are constructed to be maximally dimensionally rigid, enclose a vacuum-tight interstice 34, which can be evacuated through non-illustrated connecting branches for a vacuum pump and which is filled with heat insulation material 35, in the manner already described for the first exemplary embodiment of FIG. 1. In order to markedly simplify installation work for a household refrigerator or freezer, empty tubes 36 (see particularly FIG. 5) for receiving non-illustrated control and/or supply lines that are needed for operating a refrigerating machine, can be introduced into the heat insulation material 35. The individual wall portions 31, together with a door 37 constructed analogously thereto, enclose a refrigeration space 38 acting as a useful housing space. The door 37 rests against an opening edge of the housing 30 elastically and in a sealing manner through a magnet seal 39, in a known manner. The modular housing construction is especially well-suited for use in refrigeration cells.

In the housing construction according to the invention, coefficients of thermal conductivity of from 2 mW/mK to 15 mW/mK are obtained, thus reducing the energy consumption by at least 70%, as compared with currently conventional insulation thicknesses or ratings for refrigerating appliances. Conversely, for a currently conventional energy consumption, a substantial increase in the useful housing space, for instance for a household appliance, can be achieved.

We claim:

1. A heat-insulating housing based on a vacuum insulation, comprising:
 housing walls formed of two mutually spaced apart rigid boundary walls substantially enclosing an interstice;
 at least one door enclosing at least one useful housing space along with said housing walls; and
 slabs of pressure-resistant, open-celled, evacuatable heat insulation material in a final chemical state introduced loose into said interstice for filling said interstice, said pressure-resistant, open-celled, evacuatable heat insulation material being in direct contact with said rigid boundary walls, and wherein gas present in said pressure-resistant, open-celled, evacuatable heat insulation material is evacuated after said slabs are introduced into said interstice for providing heat insulation.

2. The heat-insulating housing according to claim 1, wherein said heat insulation material is formed of slabs of open-celled polymer foams.

3. The heat-insulating housing according to claim 1, wherein said slabs are formed of hardened polyurethane foam.

4. The heat-insulating housing according to claim 1, wherein said slabs are formed of cured polystyrene foam.

5. The heat-insulating housing according to claim 1, wherein said boundary walls have a given spacing therebetween, and said open-celled slabs have a material thickness approximately equivalent to said given spacing.

6. The heat-insulating housing according to claim 1, wherein said pressure-proof open-celled slabs have connecting locations and joining aids at said connecting locations.

7. The heat-insulating housing according to claim 1, including empty tubes disposed inside said slabs for receiving at least one of control and supply lines.

8. The heat-insulating housing according to claim 1, wherein said boundary walls are maximally dimensionally rigid.

9. The heat-insulating housing according to claim 1, wherein said boundary walls are formed of deep-drawn special steel.

10. The heat-insulating housing according to claim 1, wherein said boundary walls are formed of corrosion-protected special sheet steel.

11. The heat-insulating housing according to claim 1, wherein said boundary walls are formed of diffusion-proof plastic.

12. The heat-insulating housing according to claim 1, wherein at least some of said boundary walls have free ends, at least maximally diffusion-proof connecting elements join said at least some of said boundary walls to one another at said free ends, and said connecting elements have a coefficient of thermal conductivity $\lambda$ of 0.1 W/mK to 21 W/mK.

13. The heat-insulating housing according to claim 1, wherein at least some of said boundary walls have free ends, at least maximally diffusion-proof connecting elements join said at least some of said boundary walls to one another at said free ends, and said connecting elements have a coefficient of thermal conductivity $\lambda$ of a maximum of 1 W/mK.

14. The heat-insulating housing according to claim 1, wherein said boundary walls have dimensions individually corresponding to dimensions of said housing walls and are to be joined together to make the housing.

15. The heat-insulating housing according to claim 1, wherein said boundary walls are formed of a board individually angled in accordance with said housing walls and joining all of said housing walls to one another.

16. The heat-insulating housing according to claim 1, wherein one of said boundary walls has a connection for reducing air pressure inside said interstice enclosed by said boundary walls.

17. An oven chamber of a household oven, comprising:
 a vacuum-insulated heat-insulating housing including:
  housing walls formed of two mutually spaced apart rigid boundary walls substantially enclosing an interstice;
  at least one door enclosing at least one useful oven housing space along with said housing walls; and
  slabs of pressure-resistant, open-celled, evacuatable heat insulation material in a final chemical state to be introduced loose into said interstice for filling said interstice, said pressure-resistant, open-celled, evacuatable heat insulation material being in direct contact with said rigid boundary walls, and wherein gas present in said pressure-resistant, open-celled, evacuatable heat insulation material is evacuated after said slabs are introduced into said interstice for providing heat insulation.

18. A refrigeration chamber of a household refrigerating appliance, comprising:

a vacuum-insulated housing including:

housing walls formed of two mutually spaced apart rigid boundary walls substantially enclosing an interstice;

at least one door enclosing at least one useful refrigeration housing space along with said housing walls; and slabs of pressure-resistant, open-celled, evacuatable heat insulation material in a final chemical state to be introduced loose into said interstice for filling said interstice, said pressure-resistant, open-celled, evacuatable heat insulation material being in direct contact with said rigid boundary walls, and wherein gas present in said pressure-resistant, open-celled, evacuatable heat insulation material is evacuated after said slabs are introduced into said interstice for providing heat insulation.

19. The heat-insulating housing according to claim 1, wherein said at least one useful housing space has a given ambient pressure, said interstice filled with said slabs has a lower air pressure than said given ambient pressure, defining a pressure difference, and said boundary walls enclosing said interstice are formed of a material being diffusion proof at least approximately in accordance with said pressure difference.

20. The heat-insulating housing according to claim 19, wherein said air pressure in said interstice filled with said open-celled, thermal insulation slabs is between 0.1 mbar and 10 mbar.

21. The heat-insulating housing according to claim 19, wherein said air pressure in said interstice filled with said open-celled, thermal insulation slabs is below 1 mbar.

* * * * *